United States Patent [19]
Ruhl

[11] Patent Number: 4,595,932
[45] Date of Patent: Jun. 17, 1986

[54] RECORDER WITH CIRCUIT LINE TAMPER INDICATING SYSTEM

[76] Inventor: Hermann Ruhl, 133 Richmond St. W., Toronto, Canada, M5H 2L7

[21] Appl. No.: 486,120

[22] Filed: Apr. 18, 1983

[51] Int. Cl.⁴ .............................................. G09B 19/16

[52] U.S. Cl. ............................... 346/33 R; 346/33 D; 368/8; 324/110

[58] Field of Search .................... 346/33 R, 33 D, 18, 346/15, 123, 34; 368/6-8, 2, 9; 340/52 F, 52 R; 324/110, 113; 180/287

[56] References Cited

U.S. PATENT DOCUMENTS 3,359,561 12/1967 Shostek ............................. 346/33 R
3,950,759 4/1976 Ziegenfuss ........................ 346/33 R
4,395,624 7/1983 Wartski ............................ 346/33 D

*Primary Examiner*—E. A. Goldberg
*Assistant Examiner*—A. Evans

[57] ABSTRACT

The present invention provides a recording system for recording operating parameter information on transportation equipment, such as large trucks and the like. The recording system includes at least one circuit line for operation thereof and is characterized by a sensor for sensing circuit line impedence changes indicative of unauthorized shut down of the system, as well as a recording member responsive to the sensor for visually recording any occurrences of these impedence changes on the recording medium.

10 Claims, 2 Drawing Figures

2 +V 2a C 2b 2c 10 12 11 RECORDER CLOCK 3 +V 15 4 14 13 TIME SET 'A' 16 TIME SET 'C' TIMER 8 9 INPUT TO HIGH LEVEL RECORDINGS TIME SET 'B' 19 TIME SET 'D' 6 +V 18 17 26 25 5 +V 20 RECORDER POWER SUPPLY 21 23 22 24 7

RECORDER CLOCK
INPUT TO HIGH LEVEL RECORDINGS

TIMER
TIME SET 'A'
TIME SET 'C'
TIME SET 'B'
TIME SET 'D'
RECORDER POWER SUPPLY
+V
2a
2b
2c
C
10
12
11
9
8
13
16
19
25
20
26
18
6
24
17
15
14
22
23
21
3
4
5
7
2

RECORDER WITH CIRCUIT LINE TAMPER INDICATING SYSTEM

FIELD OF THE INVENTION

The present invention relates to a transportation equipment recording system having sensing faulty conditions within the circuit line of the system and recording means for visually recording and highlighting the occurance of the faulty conditions.

BACKGROUND OF THE INVENTION

Operating parameter recorders for transportation equipment, such as speed or rpm tachographs for road vehicles and other similar equipment are used to provide a record of the operation of the equipment. For a number of reasons, the operators in direct charge of the equipment may want to conceal the occurrence of certain conditions or to influence the length of time for various periods recorded by the tachograph. Accordingly, the operator may, in certain instances, falsify the recordings made by the recorder. In addition, the recorder itself or the input devices to the recorder are subject to failure, which may not be recognizable from the recordings made by the tachograph.

Some recorders have been developed from purely mechanical arrangements with mechanical clock mechanisms being used to drive the recording medium and mechanical means for moving the recording styli. Other instruments have been developed with electrically and electronically operating instruments having electronic clock and electronic controls of the styli. In either case, one of the most important protective steps is to make sure that there is no interruption of the power supply to the clock mechanism, or the power supply to the styli without recognition of such an interruption. If, for example, the power supply to the clock is interrupted, then the recording medium is not advanced during the interruption. In addition, when the vehicle is stopped, there are not recordings made of speed, distance, engine operation, etc. Therefore when the power to the clock is removed, there are no recordings made whatsoever, but this does not show up on the recording medium. Therefore, if the operator disconnects power to the tachograph, he can manipulate the recordings made on the recording medium. For example, if the vehicle is stopped for a period of one hour but the operator has disconnected the power supply for three quarters of that period, then the stopping period appears to be only one quarter of an hour on the recording medium, as falsified by the operator.

Another method of falsifying recordings made in electronic instruments controlled by electric pulses sent to the tachograph in accordance with engine or vehicle speed is to disconnect the electrical connection between the sending units of the pulses and the recording instrument. By doing so, no speed signals reach the instrument which records on the medium in a fashion to indicate that the vehicle was not moving during this time period. The operator can, therefore, make trips during his shift which are not recorded.

The tachograph itself can be opened in order to permit insertion and removal of the recording medium or chart within the instrument. It is, however, a standard rule that the device should only be opened at the beginning of a workshift to insert the chart and that it not be opened again until the end of workshift, when the chart is removed from the instrument. In some cases, this rule is not complied with as the proper recording of the instrument can be influenced by opening during operation. It is, therefore, important that such openings are clearly and visibly recorded on the recording medium.

Another method of tampering with a tachograph that is, for example, used on a diesel truck is to disconnect the ignition for the truck after it is in motion, which also disconnects the power to the tachograph such that it does not record during such periods.

As described above, there are, therefore, a number of different methods of breaking the circuit line connections to a standard tachograph and, in accordance with conventional construction, the circuit line breakages are very difficult if not impossible to detect.

SUMMARY OF THE INVENTION

The present invention provides a transportation equipment recording system specifically designed to visibly indicate unauthorized inoperative periods of the recorder. The system includes at least one circuit line for its operation and is characterized by sensing means for sensing impedance changes in the circuit line representative of these inoperative periods as well as recording means responsive to the sensing means for visually recording any occurrences of these impedance changes directly on the recording medium.

The sensing means itself is adapted such that it recognizes when normal operating conditions are re-established and according to an aspect of the present invention, timing circuits are provided to which the sensing means transmits signals such that the timing circuits in turn send signals to the recording means, which produces recordings characteristic for the types of failures or interferences which have occurred to cause the inoperative periods. These recordings, which are different from those recorded for authentic recordings of on/off conditions of the operating parameters, are produced in a manner such that they are highly recognizable on the recording medium.

BRIEF DESCRIPTION OF THE DRAWINGS

The above, as well as other advantages and features of the present invention, will be described in greater detail according to the preferred embodiments of the present invention in which.

DETAILED DESCRIPTION OF THE PREFERRED EMBODIMENTS

Figure 1:
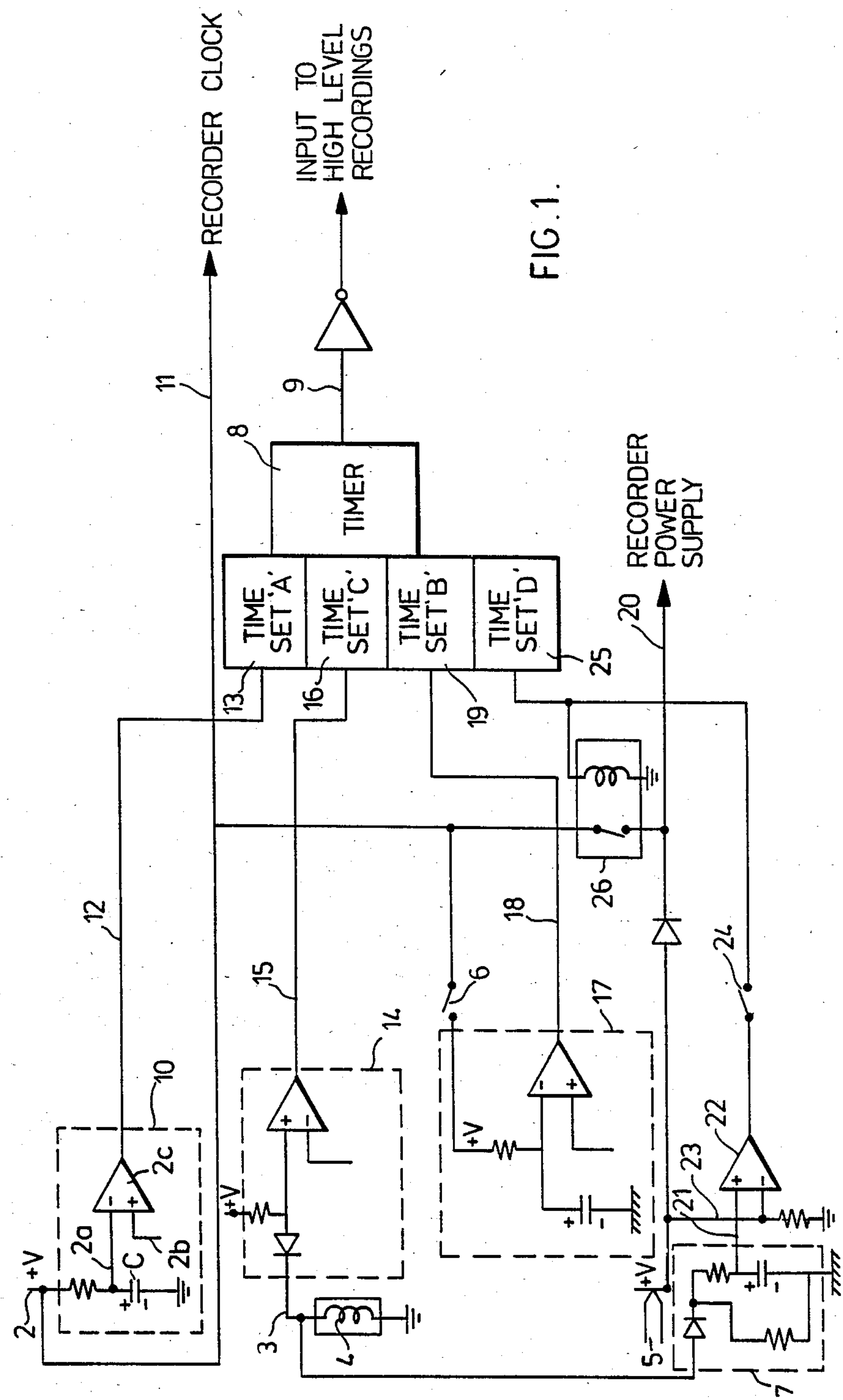
FIG. 1 is a schematic view of a control system used for detection of tampering to a recording instrument in accordance with a preferred embodiment of the present invention.

The control arrangement of FIG. 1 is used in conjuntion with an electronically operated automotive recorder with the recorder itself having a somewhat standard construction. More specifically, the recorder to which the protective system of the present invention is applied includes an electronic quartz clock which drives a recording medium consisting of a circular chart at a constant speed. In order to keep the power consumption of the recorder to a minimum, two electrical connections to the vehicle battery are provided. One of these connections is for the clock itself and should be operated at all times in order to maintain correct absolute time such that the clock mechanism is even driven when the vehicle is stopped. The second power connection to the battery provides power to move the various styli in the instrument and this particulr source of power is only required when the vehicle or the engine is in operation. This second connection is, therefore, usually connected to the ignition switch of the vehicle.

Again, in accordance with standard construction, the vehicle is equipped with a pulse generator which supplies pulses to the recording instrument in order to indicate and record speed and distance travelled by the vehicle.

Referring now to the features of the present invention, a tampering and fault protection arrangement is connected to the recording instrument. This arrangement comprises a protective control board 1 installed in the recording instrument, such that it is not accessible to the operator of the vehicle. The control board includes four input sensing lines for detecting of failure or tampering causing impedance changes and affecting the resistance, capacitance and/or inductance of any one of the input functions through these lines to the tachograph. These input or circuit lines comprise line 2, which is connected to the battery or the permanent power supply; line 3, which is connected to a pulse generator 4 supplying pulses to the instrument to measure speed and distance; line 5, which is connected to the ignition switch and which only supplies power to the recording device when the ignition is switched on and door switch 6 provided within the tachograph which supplies permanent power to the instrument only when the tachograph lid or door is closed.

All four of these circuits provide an input to a timing system or circuit 8 which has an output line 9. This output line is connected to an electrically operated recording styli in the tachograph and causes the styli to make continuous time spaced up and down strokes as long as power is supplied through line 9 to the instrement.

Figure 2:
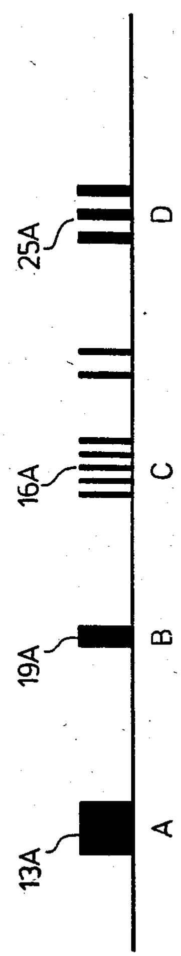
FIG. 2 is a graphic illustration of typical recordings made through the use of the control system shown in FIG. 1.

Referring in detail to FIG. 1, input line 2 or the permanent connection to power, is connected on the board to an output line 11 which leads to the electric clock of the tachograph. Line 2 is further connected to a "power on" signalling device 10 which has an output line 12 connected to a timing device 13. This timing device is part of the timer system 8 mentioned above. The power on signaling device has no output as long as there is continuous power from the battery to the tachograph, nor does it have an output if the input line 2 is disconnected from the battery causing a discharge of capacitor C. However when the power line is reconnected, there is a voltage buildup along line 2*a* as the capacitor charges until this voltage buildup equals the voltage along line 2*b*. During this power buildup signaling device 10 provides an output pulse along line 12 which in turn triggers timer 13, to provide an output pulse for a given period of, for example, ten minutes. The output pulse from timer 13 is sent directly to the recording stylus of the tachograph to produce a marking, as shown at 13*a* in FIG. 2, whenever timer 13 receives an input pulse from line 12.

A second method of falsifying the recordings is to disconnect pulse generator 4 from the tachograph, such that the tachograph does not receive any speed information. However, in accordance with the present invention, pulse generator 4 is connected to a current detecting circuit 14. As along as current flows from the current detecting circuit through line 3, which occurs when pulse generator 4 is connected to ground, current detecting circuit 14 remains inactive. However, when the pulse generator is disconnected from the current detecting circuit, the sensing amp within the circuit senses increased voltage and causes an output pulse on line 15 from the current detecting circuit. Line 15 is connected with timer 16 which, again, forms part of the timing system 8. The pulse from the current detecting circuit continues as long as pulse generator 4 is disconnected from the circuit. Timer 16, which receives the output pulses designed to provide its own output pulse on line 9 of short duration of specified intervals of, for example, a pulse of twenty seconds duration for every five minutes. The resulting recording pattern is indicated at 16*a* in FIG. 2.

Door switch 6, described above, is a special switch installed directly within the recording device to detect whether or not the access through the lid or cover of the recording device is opened. When the cover is properly closed for operation, the switch is also closed. This switch is connected at one side to the permanent power connection 2 and at the other side to a power on signaling device 17. This power on signaling device 17 is arranged to provide an output pulse on line 18 in the event that the switch is opened and then closed during operation of the vehicle. The operation of device 17 is very similar to that of signaling device 17 in that the reclosing of switch 6 causes a power buildup within device 17 to generate the output pulse along line 18 to a timer 19. Timer 19 sends a onetime pulse along line 9 to the recording stylus of the tachograph. This pulse is of a duration to produce a marking, as shown at 19*a* in FIG. 2. Therefore, the pulse from timer 19, which may for example last four minutes, is substantially shorter than the pulse supplied from timer 13, so that the recording patterns are distinctive from one another.

Although switch 6 is shown as a mechanical switch it may also be an electrical switch the capacitance and/or inductance of which changes when the lid of the tachograph is opened. This type of impedance being rather than the complete line interruption for resistance change described above is sensed and recorded on the recording medium.

A further method of falsifying recordings is to disconnect input line 5 from the control board. This input line is connected to the ignition switch and, therefore, power is available on line 20 only when the ignition switch is on. Line 20 leads to the power supply of the recording instrument and this power supply is not permanently connected to the battery, since as mentioned above, the resulting power drain is undesirable. Power in the recording instrument is only normally required when the engine is in operation while the vehicle is moving, such that the ignition is switched on and the power supply is activated. It is, however, possible to disconnect the line to the ignition from the recording instrument and one of the disadvantages with normal recording systems is that the length of time of the power failure or disconnection cannot be determined from the recordings. According to an aspect of the present invention, this difficulty is overcome through the use of an auxiliary power supply within the recorder which takes over the drive of the clock mechanism and the recording stylus during the time of power supply failure, so that the recording instrument continues to record as if the failure has not occurred. According to this preferred embodiment of the invention, the undesirable disabling of the recording instrument is detected as follows.

The pulses from pulse generator 4 are fed into a motion detector circuit 7 which sends a positive pulse through line 21 into a level detector 22. This level detector is connected through line 23 to the positive power line 5. Level detector 22 is arranged such that whenever line 5 is connected the level detector cannot provide a positive output pulse along its output line 24. If however line 5 is disconnected from the power supply and pulses continue to arrive from the pulse generator 4 into the motion detecting circuit 7, an output pulse is fed from the motion detector circuit along line 21 to the level detector which sends its own output pulse along line 24 to timer device 25 of timing system 8. Line 24 is also connected to the coil of a relay 26 and, when line 24 is activated, this relay which is normally open, closes and connects output line 20 with the permanent power line 2. Accordingly, the recording function of the instrument is restored. Furthermore, timer 25 sends a pulse through line 9 to the stylus to produce a recording pattern as shown at 25a in FIG. 2. This pattern continues as long as pulses are sent from the pulse generator to the motion detector with line 5 being disconnected. In the example shown in FIG. 2, the pulses, which are highly recognizable from any other pattern in the Figure, have a duration of two minutes and occur at five minute intervals. Accordingly, it is very easy to determine from the distinctive recording patterns which particular circuit line breakage has occurred from a very quick visual inspection of the recording medium.

The examples given above relate specifically to an electronic tachograph. However, in the case of a mechanical or magnetic type of speed or engine rpm recorder, the fault detection circuit could be simplified, since the methods of falsifying the recordings are more difficult in a non-electronic tachograph. For example, in a magnetic type of tachograph, it is extremely difficult to disconnect the speed input and the fault detection system would normally only be directed to the recording of the lack of power to the clock mechanism and/or the door opening of the instrument.

There is, however, an additional protection for mechanically driven tachographs which are equipped with additional electrically operated stylus to record engine idling. Again in a standard tachograph, efforts to conceal engine operation and driving of the vehicle can be made by disconnecting the mechanical drive cable and also by interrupting the connection between the electrical idling stylus and the ignition switch. However according to the present invention, the following improvement is made for the detection of such a method of falsifying recordings.

Provided parallel to the ignition switch or any other switch normally closed during engine operation or vehicle movement is a resistor. This resistor provides a minimal current if the switch is open. This minimal current is sensed by a current sensing switch on the protective control board, so that if the current is interrupted by cutting the line to the ignition switch or any other control switch, the current sensing switch will cause the stylus to record a failure indicating pattern on the recording medium through a timing system similar to any of those described above.

It should however be appreciated that other distinctive recording patterns could also be produced. For example the recording stylus can be controlled to record at different vertical positions on the chart in accordance with the particular type of fault sensed. It can also be controlled to produce markings of different heights for different sensed conditions.

This same method may also be used to record interference with any other control switches used on the vehicle to control specific functions, as for example opening of truck or trailer doors, etc.

As has been described above, the present invention provides different types of sensing systems for sensing circuit line breakages to the recorder of various types of transportation equipment. These sensing systems send out signals to control the recording stylus of the recorder to record a distinctive pattern directly on the same recording medium used for the recording of the various operating parameters of the equipment. Accordingly, even though falsification of recordings may be attempted by the vehicle operator, these falsifications become readiy apparent through the tamper detection system of the present invention.

Although various embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A transportation equipment recording system for recording operating parameter information of the equipment on a recording medium, being characterized by at least one sensing means for sensing occurences of circuit line impedance changes representative of unauthorized inoperative periods within said recording system and recording means responsive to said sensing means for visually recording such occurences on the recording medium.

2. A recording system as claimed in claim 1 characterized by at least one sensing system for sensing a faulty condition of the recording system selected from the group consisting of disconnection of power supply from the system, opening of the recorder and disconnection of a input device said sensing system providing output signals, depending on the faulty condition sensed; said recording means being controlled by the output signals proividing recordings indicative of the faulty conditions.

3. A recording system as claimed in claim 2 characterized by a timing system receiving the output signals from the sensing system, which provides preset signals indicative of the faulty condition concerned to said recording means within the recorder when the faulty condition is corrected.

4. A recording system as claimed in claims 1, 2 or 3 characterized by recording means capable of recording different faulty conditions by producing recordings at different vertical positions on the recording medium in accordance with a particular sensed condition.

5. A recording system as claimed in claims 1, 2 or 3 characterized by a timing system recieving signals from the sensing system which provides preset signals of a specific time pattern to said recording means recording in a specific location of the recording medium and such time patterns being indicative of a specific faulty condition.

6. A recording system as claimed in claim 1, characterized by at least one sensing system for sensing faulty conditions caused by circuit line breakage of outside power supply to the system, said recorder being provided with standby auxiliary power supply to operate said sensing system and to additionally operate said recording means, said sensing system being connected to said recording means to record a distinctive pattern indicative of the circuit line breakage of the outside power supply.

7. A recording system as claimed in claim 1 or 2, characterized by a sensing system connected to access means to the recorder of said system, this sensing system being connected to a timing circuit being adapted to send a characteristic electrical signal for a predetermined time period to said recording means within the recorder to record a distinctive pattern indicative of the opening and reclosing of the access means.

8. A recording system as claimed in claim 1, 2 or 3, characterized by an electrical drive system for the recording medium with a connection between said drive system and an electrical power source, a sensing system to detect an interruption of the power supply to the electrical drive means and a triggering circuit giving a signal to a timer when the electrical power to the drive system is re-established, when then sends a characteristic signal for predetermined time periods to said recording means.

9. A recording system as claimed in claim 1, 2 or 3, wherein said recording means for recording the parameter information is electrically powered, a sensing system to detect an interruption of power supply to said recording means, a triggering circuit giving a signal to a timer when the power supply is re-established, which sends a characteristic signal for a predetermined time period to said recording means.

10. A recording system as claimed in claim 1, 2 or 3 characterized by an electrical pulse sending unit supplying signals representative of the operating parameter information, connecting circuits of said sending units to the recorder, of said system and at least one sensing circuit for detecting interruptions preventing the signals to parameter measuring means of said system, said at least one sensing circuit sending characteristic signals to said recording means to record occurrences of the interruption of the recording medium.

* * * * *